No. 633,130. Patented Sept. 19, 1899.
T. F. FEENY.
FRICTION GEAR FOR BICYCLES.
(Application filed Feb. 4, 1898.)
(No Model.)
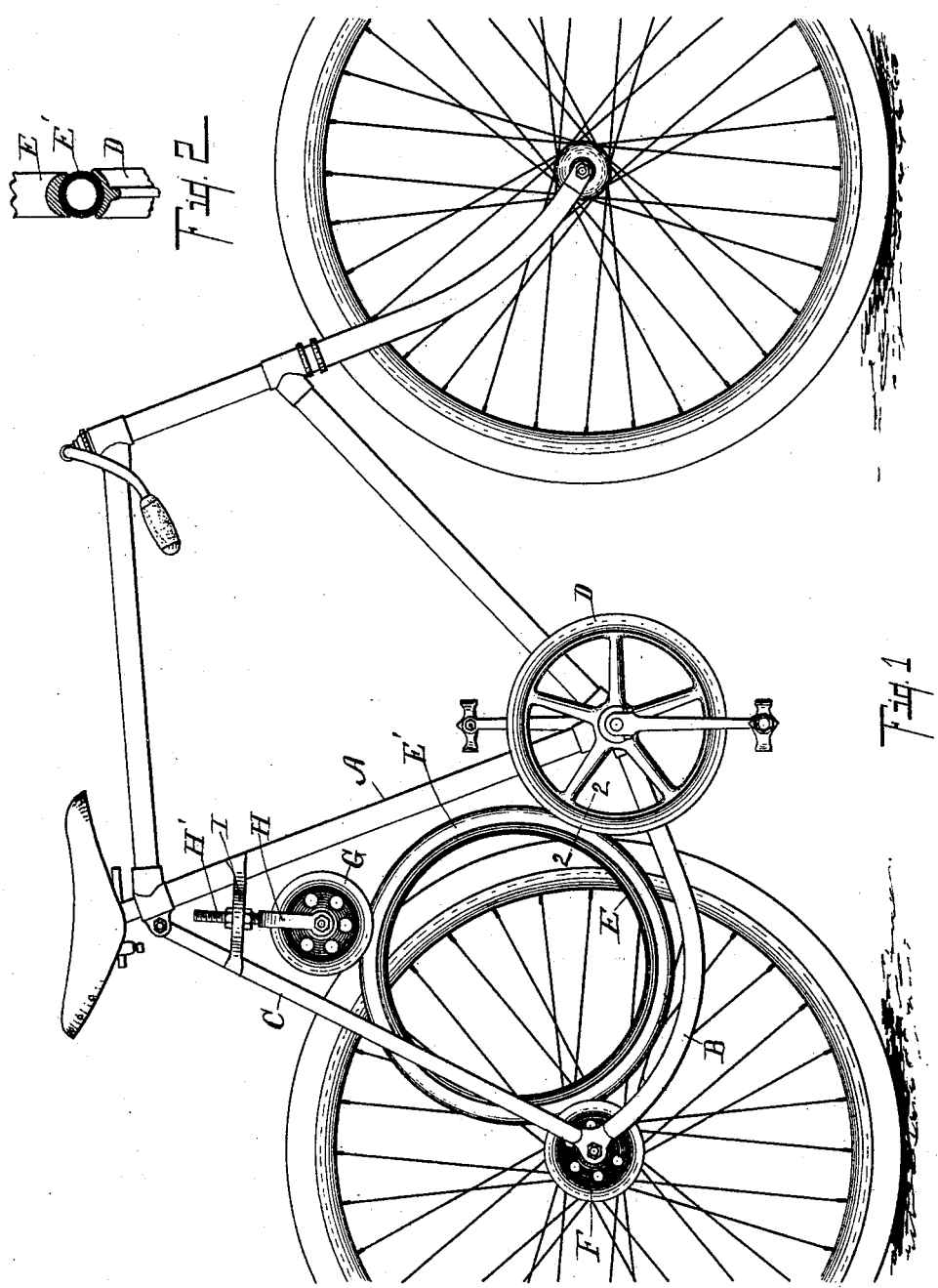
Witnesses.
Inventor.

UNITED STATES PATENT OFFICE.

THOMAS F. FEENY, OF BOULDER, COLORADO; CLAIRE B. FEENY ADMINISTRATRIX OF SAID THOMAS F. FEENY, DECEASED.

FRICTION-GEAR FOR BICYCLES.

SPECIFICATION forming part of Letters Patent No. 633,130, dated September 19, 1899.

Application filed February 4, 1898. Serial No. 669,147. (No model.)

*To all whom it may concern:*

Be it known that I, THOMAS F. FEENY, a citizen of the United States, residing at the city of Boulder, in the county of Boulder and State of Colorado, have invented certain new and useful Improvements in Friction-Gear for Bicycles, of which the following is a specification.

This invention relates to improvements in bicycles and similar vehicles.

The objects of this invention are, first, to overcome the necessity of the use of sprocket-chains in propelling the same; second, to provide an improved friction-gear for use on bicycles and for similar purposes; third, to provide a new and improved means supporting the gearing of a bicycle, and, fourth, to provide an improved means of guiding a friction-gear to place.

Further objects will definitely appear in the detailed description to follow.

I accomplish these objects of my invention by the devices and means described in this specification.

The invention is definitely pointed out in the claims.

The invention is thoroughly illustrated in the accompanying drawings, in which—

Figure 1 is an enlarged detail side view of a bicycle embodying the features of my invention. Fig. 2 is a detail section view taken on line 2 2 of Fig. 1, showing the method of contact between the friction-ring of wheel and the driving-wheel on the crank-shaft.

In the drawings similar letters of reference refer to similar parts throughout both views.

Referring to the lettered parts of the drawings, A is the down tube of the bicycle.

C is one of the rear forks, the opposite one being on the opposite side.

B is the bottom fork of the machine, which has the corresponding part on the opposite side of the rear or driving wheel.

On the crank-shaft of my improved bicycle I place a grooved wheel D in place of the usual sprocket-wheel, and on the hub of the rear or driving wheel I place also a grooved wheel F in place of the usual sprocket-wheel at that point. Adapted to rest upon these smaller wheels F and D is a wheel E, having a pneumatic tire E', adapted to fit in the grooves on the wheels B. D and F serve to transmit the power from the front wheel to the rear wheel F by friction. The wheel E is practically only a rim or ring, and it is retained in place by an idle-wheel G, which is also grooved to correspond to the same. This is supported on a suitable bar or ratchet I, supported between the down tube A and one of the rear forks C, so that it can come to one side of the rear wheel of the bicycle. This also serves as the tension device for putting pressure upon the wheel or rim E to cause it to transmit the power. The idle-wheel G is supported by a fork which is adjustable by means of the bolt H', extending through the bracket or bar I, where it is secured by suitable threaded nuts, one above and one below. I prefer to use a pneumatic tire and a rim because it is capable of being inflated and made to insure the proper pressure, and at the same time it is very light. I desire to state, however, that a solid rubber tire might be used or other material having suitable qualities. I also desire to state that other frictional gear could be employed in this relation. The usual cog might be provided on rims and gears and be supported as I have shown. Cog and gearing or sprocket-gearing of any kind, however, is objectionable.

This improved friction-gear, as I have shown, is adapted to use on other vehicles than bicycles, as on tricycles, and for transmission of power generally. Owing to the fact that the gear is elastic, no jolts and jars can be given to injure parts of the machine; also that gears are made elastic, so that a jolt or blow is not liable to affect the gear itself injuriously. It must be clear that the comparative sizes of the gears can be varied indefinitely to secure any desired result.

I desire to state that numerous variations are possible.

It is possible to arrange the gear entirely inside the forks; but as this invention relates to the gearing, and not particularly to the frame, this form is not here illustrated.

Having thus described my invention, what

I claim as new, and desire to secure by Letters Patent, is—

1. In a bicycle or velocipede the combination of a frame and wheels in the usual form; a grooved wheel on the crank-axle in place of the front sprocket-wheel, a grooved wheel on the rear axle in place of the rear sprocket; a ring or wheel with a suitable tire resting on said grooved wheels; and an idle grooved wheel engaging the ring above and adjustably supported by a suitable bracket on the frame for the purpose specified.

2. In a bicycle the combination of a grooved wheel on the crank-axle; a grooved wheel on the rear axle; a rim to rest on said grooved wheels; an idle grooved wheel supported on the frame above to retain and guide said rim-wheel in place for the purpose specified.

In witness whereof I have hereunto set my hand and seal in the presence of two witnesses.

THOMAS F. FEENY. [L. S.]

Witnesses:
D. E. DOBBINS,
A. M. RICHARDSON.